(12) United States Patent
Stonehocker

(10) Patent No.: US 11,539,920 B1
(45) Date of Patent: Dec. 27, 2022

(54) SIDEBAR CONVERSATIONS

(71) Applicant: SoundHound, Inc., Santa Clara, CA (US)

(72) Inventor: Timothy P Stonehocker, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 17/353,639

(22) Filed: Jun. 21, 2021

(51) Int. Cl.
| | |
|---|---|
| *H04N 7/15* | (2006.01) |
| *H04L 65/403* | (2022.01) |
| *H04L 65/1069* | (2022.01) |
| *G10L 15/22* | (2006.01) |
| *G10L 25/57* | (2013.01) |
| *G06F 3/16* | (2006.01) |
| *G10L 15/08* | (2006.01) |

(52) U.S. Cl.
CPC ............. *H04N 7/152* (2013.01); *G06F 3/165* (2013.01); *G10L 15/08* (2013.01); *G10L 15/22* (2013.01); *G10L 25/57* (2013.01); *H04L 65/1069* (2013.01); *H04L 65/403* (2013.01); *G10L 2015/088* (2013.01)

(58) Field of Classification Search
CPC ......... H04N 7/15; H04L 29/06; H04L 65/403; H04L 15/1822; G10L 15/08; G10L 15/22; G10L 25/57; G10L 17/00; G10L 2015/223; G06F 3/16; G06F 16/90332
USPC ............................................ 348/14.01–14.16
See application file for complete search history.

(56) References Cited

U.S. PATENT DOCUMENTS

| | | | |
|---|---|---|---|
| 9,003,302 B1* | 4/2015 | Wageman | H04L 65/4061 715/752 |
| 10,424,297 B1 | 9/2019 | Carino | |
| 2005/0060368 A1 | 3/2005 | Wang et al. | |
| 2005/0128283 A1* | 6/2005 | Bulriss | H04N 7/147 348/14.1 |

(Continued)

OTHER PUBLICATIONS

Horaizon, Horaizon—Explained, YouTube video, Jul. 4, 2020, https://www.youtube.com/watch?v=7HQi9Jy9Fh0.

(Continued)

*Primary Examiner* — Melur Ramakrishnaiah
(74) *Attorney, Agent, or Firm* — Dana Legal Services; Jubin Dana

(57) ABSTRACT

A system and a method are disclosed that enable sidebar conversations between two or more attendees that are participating in a primary or main meeting. The sidebar conversation occurs in conjunction or concurrently with the primary meeting. A first attendee provides commands to indicate a desire to initiate a sidebar conversation and information about a targeted attendee. The commands are analyzed to determine if a trigger phrase is included. The commands are analyzed to determine if there is an identification of a second (targeted) attendee, who is currently participating in the main meeting. If the second attendee is available, then the sidebar conversation is initiated. Additional attendees can be added to the sidebar conversation. Additional independent and simultaneous sidebar conversations can be initiated (by attendees currently participating in the active sidebar conversation), thereby allowing one attendee to conduct multiple simultaneous sidebar conversations while being able to switch between them.

43 Claims, 12 Drawing Sheets

(56) References Cited

U.S. PATENT DOCUMENTS

| | | | | |
|---|---|---|---|---|
| 2006/0098085 A1* | 5/2006 | Nichols | ............. | H04M 1/72427 |
| | | | | 348/14.02 |
| 2007/0276908 A1* | 11/2007 | Asthana | ................ | H04M 3/567 |
| | | | | 709/204 |
| 2009/0132256 A1* | 5/2009 | Geldbach | ................ | G10L 15/08 |
| | | | | 704/E11.001 |
| 2012/0002002 A1* | 1/2012 | Shaffer | .................... | H04N 7/15 |
| | | | | 348/14.09 |
| 2012/0017149 A1* | 1/2012 | Lai | ........................ | H04L 65/403 |
| | | | | 715/758 |
| 2014/0369491 A1* | 12/2014 | Kloberdans | ......... | H04M 1/6008 |
| | | | | 379/421 |

OTHER PUBLICATIONS

Pauyl Thurrot, Hands-On with Skype Preview's New Picture-in-Picture Mode, thurrott.com, Mar. 6, 2017, https://www.thurrott.com/windows/windows-10/106236/hands-skype-previews-new-picture-picture-mode.

Amit Barave, Test Drive the Cisco Webex Assistant for Free—Bring Voice Intelligence to Your Meetings, Cisco Blogs, Jun. 17, 2020, https://blogs.cisco.com/collaboration/test-drive-the-cisco-webex-assistant-for-free-bring-voice-intelligence-to-your-meetings.

Kacy Kizer, Meet Cisco Webex Assistant, the voice assistant for work, Webex Blog, https://blog webex.com/video-conferencing/meet-cisco-webex-assistant-the-voice-assistant-for-work/.

Sabbir Alam, Michael Cohen, Julian Villegas, and Ashir Ahmed. "Narrowcasting for articulated privacy and attention in SIP audio conferencing." Journal of Mobile Multimedia (2009): 012-028.

Yankelovich, Nicole, Jen McGinn, Mike Wessler, Jonathan Kaplan, Joe Provino, and Harold Fox. "Private communications in public meetings." In CHI'05 extended abstracts on Human factors in computing systems, pp. 1873-1876. 2005.

Alam, Mohammad Sabbir, Michael Cohen, and Ashir Ahmed. "Narrowcasting: Implementation of privacy control in SIP conferencing." In 2007 IEEE International Conference on Multimedia and Expo, pp. 703-706. IEEE, 2007.

Jared Spataro, Reimagining virtual collaboration for the future of work and learning, Microsoft.com, Jul. 8, 2020.

R. Even, N. Ismail, Conferencing Scenarios, Internet Society—Networking Group, Jul. 2006, Internet Society.

* cited by examiner

SIDEBAR CONVERSATIONS

FIELD OF THE DISCLOSURE

The present technology is in the field of communication systems and, more specifically, related to allowing secondary video sessions to be active while a primary video session remains active.

BACKGROUND

In traditional in-person meetings, two attendees can have a conversation by whispering to each other. For example, while a presenter is presenting to an audience during a meeting, one audience member may lean over to another audience member sitting next to them and say or whisper a comment, such as "didn't this idea come up a few years ago?" This sidebar conversation between two audience members may be relevant to the active meeting and can occur without interrupting the meeting.

With the growth of remote meetings (e.g., teleconferences, video conference, webinars, etc.), having sidebar conversations is not possible due to the distance between or remotely located attendees or audience members. While attendees can communicate over text-based solutions (e.g., text chat tool, text message on cellphone, etc.), typing a message is slower than speaking, text cannot capture the same intent as a spoken voice (e.g., tone, inflections, expressiveness of prosody, etc.), and conversations outside the main communication medium are not captured.

SUMMARY

Presently disclosed are systems and methods that enable sidebar conversations between two or more attendees, which are participating in a primary or main meeting, such that the sidebar conversation occurs in conjunction or concurrent with the primary meeting. According to one or more examples, a first attendee provides commands to the first attendee's terminal to indicate a desire to initiate a sidebar conversation (during the active main meeting) and information about a targeted attendee who is to participate in the sidebar conversation. According to one or more examples, the first attendee's terminal sends data (audio, video, and other information) to a server, which is controlling the main meeting.

The server receives the data. The server analyzes the data to determine if a (or detect that a) trigger phrase was spoken by the first attendee. The server determines if there is an indication/request for a sidebar conversation by the first attendee. The server also determines if there is an identification of a second (targeted) attendee, who is currently participating in the main meeting. In some embodiments, if the second attendee is available, then the server sends a response message to the first attendee's terminal indicating that a sidebar conversation may be available with the identified or targeted attendee. In some embodiments, once the sidebar conversation is initiated, additional attendees can be added to the sidebar conversation. In some embodiments, additional independent and simultaneous sidebar conversations can be initiated (by attendees currently participating in a sidebar conversation) and established, thereby allowing one attendee to conduct multiple simultaneous sidebar conversations, including switching between the simultaneous sidebar conversations.

DETAILED DESCRIPTION

Figure 1:
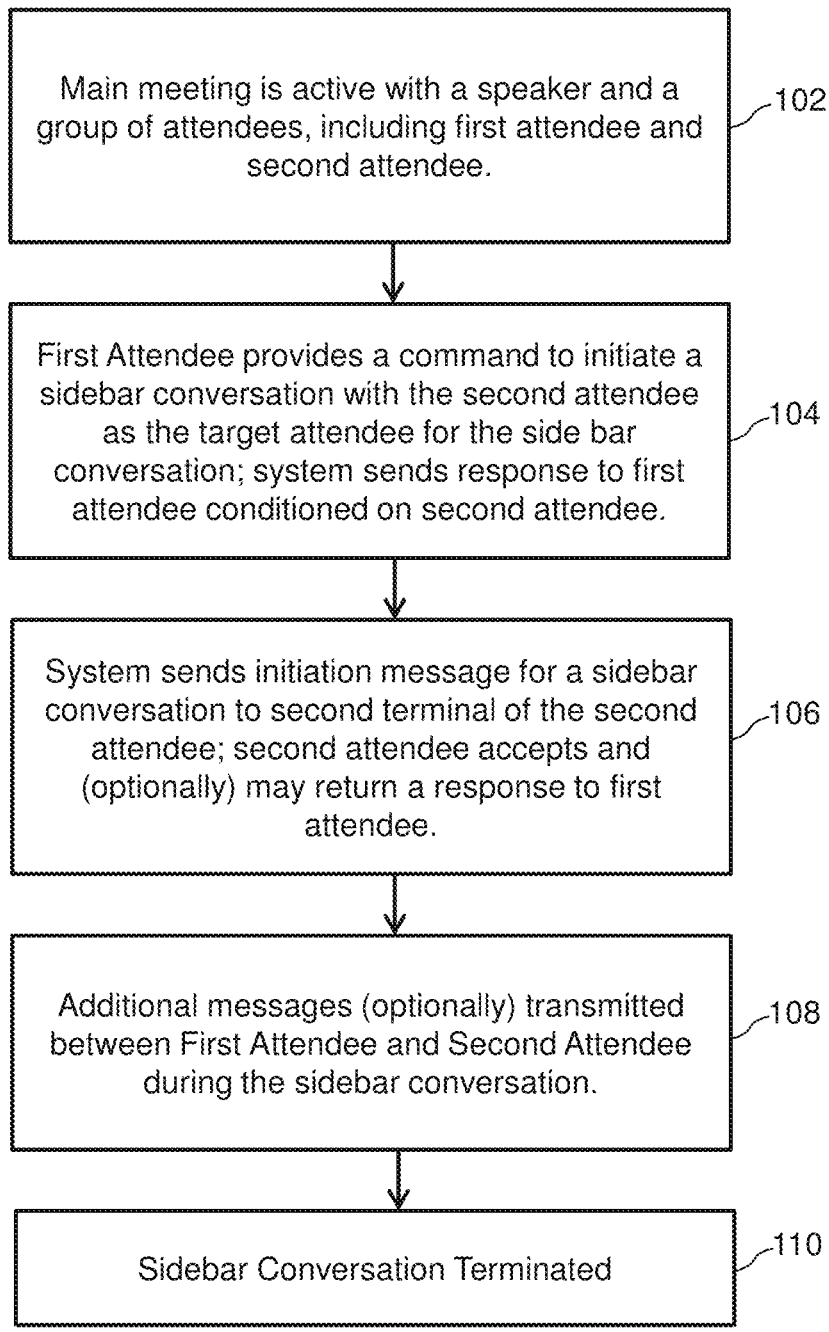
FIG. 1 is a flow diagram showing a method of performing a sidebar conversation in accordance with various examples.

The following describes various examples of the present technology that illustrate various interesting aspects. Generally, examples can use the described aspects in any combination. All statements herein reciting principles, aspects, and examples are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the invention. Thus, appearances of the phrases "in one case," "in at least one example," "in an example," "in certain cases," and similar language throughout this specification may, but do not necessarily, all refer to the same embodiment or similar embodiments. Furthermore, aspects and examples of the invention described herein are merely exemplary, and should not be construed as limiting of the scope or spirit of the invention as appreciated by those of ordinary skill in the art. The disclosed invention is effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In examples showing multiple similar elements, even if using separate reference numerals, some such examples may work with a single element filling the role of the multiple similar elements.

Certain examples described herein relate to an audio processing system. The audio processing system may be used to help convert recorded speech into text or machine-processable commands. These speech processing components may use the data output by the audio processing system to determine a set of words that are spoken within the audio data.

Referring now to FIG. 1, according to one or more examples, a process is shown that is executed by an attendee's terminal to initiate a sidebar conversation during a main meeting. According to various examples, the main meeting is a video conference. According to various examples, the main meeting is an audio-only conference. According to various examples, the process is implemented by a server that is controlling the main meeting and the connection between some or all of the attendees in the main meeting. According to some examples, the server includes information about each attendee and manages the distribution of the meeting to all the terminals (of the attendees) connected to and participating in the main meeting. According to the various examples, each attendee's terminal includes a sidebar conversation module that provides the communication protocol needed to connect to the server through a Local Area Network (LAN) or the internet. Based on the present invention, those skilled in the art would appreciate that the connection between the server and the attendee's terminal can be set up in various configurations to allow processing information either locally to the terminal or at the remote server.

At step 102, during the main meeting, a main presenter or speaker is communicating over an electronic medium (e.g., teleconference or video conference) with a group of attendees. The group includes a first attendee and a second attendee. At step 104, the first attendee provides a command, through a first terminal, intended to initiate a sidebar conversation by identifying or selecting the second attendee. According to the various examples, the first attendee's terminal sends a stream of audio spoken by the first attendee to a server. The server manages the main meeting (video conference). The server analyzes the stream of audio. The server determines that a sidebar conversation is being requested and identifies a second attendee from analysis of the stream of audio. The server selects the second attendee's identity. According to some embodiments, the server sends to the first attendee's terminal a response message based on analysis of the stream of audio. The response message may include any one of: a request to confirm the sidebar conversation; and/or the selected second attendee's identity. The first attendee can reply to the response message. According to various examples, the reply can confirm the second attendee. According to the various examples, the reply can result in the server sending a request message to a second attendee's terminal indicating a request to participate in a sidebar conversation. The server sends the second attendee a sidebar conversation request. The second attendee may reject the request to participate in the sidebar conversation. If the sidebar conversation request is rejected, then the second terminal sends a rejection response to the server to indicate that the sidebar conversation request has been rejected.

According to various examples, the communication between the first attendee's terminal and the server can be reduced if some aspects of the invention are performed at the first attendee's terminal. For example, the first attendee's terminal can analyze the stream of audio to determine the second attendee's identity and provide the identity to the server along instead of or with the stream of audio.

According to one or more examples, the first attendee selects the second attendee a keyboard or other input device such as a mouse, a touch sensitive screen, or a microphone enabled with speech recognition. According to one or more examples, the first attendee may speak the second attendee's name to select the second attendee. According to one or more examples, the first attendee may speak a key phrase followed by the second attendee's name to select the second attendee. According to one or more examples, the feature of selecting a second attendee may only be enabled when the first attendee's microphone is muted with respect to the main meeting. According to one or more examples, recording and/or sending a message from the first attendee to the second attendee is delayed until the second attendee accepts the request to hold the sidebar conversation.

At step 106, the server generates and sends an initiation message or notification to the second terminal of the second attendee to indicate that a sidebar conversation has been requested by another (first) attendee. According to some scenarios, after receiving the initiation message (notification) of the sidebar conversation request, the second attendee accepts the sidebar conversation request. The second terminal (of the second attendee) sends an acceptance response to the server. The server receives the acceptance response. The server establishes the sidebar conversation between the first terminal and the second terminal. The server sends to the second terminal (and the second attendee consumes) the message from the first attendee. According to one or more scenarios, the second attendee returns a response to the first attendee's message. The second attendee listens to the message from the first attendee. According to one or more examples, the second attendee's response is a recorded voice message. According to one or more examples, the second attendee's response is another message that is sent to the first attendee before starting the sidebar conversation.

At step 108, a video session is started, by the server, as part of sidebar conversation displayed on the first attendee's and the second attendee's terminal. Additional messages and/or responses are optionally transmitted between the first and second attendee. According to one or more examples, the additional messages and/or responses are text type messages that are sent during the sidebar conversation as outline below. According to one or more examples, the additional messages and/or responses are any type of message that is sent after the sidebar conversation is completed.

At step 110, the sidebar conversation is terminated. According to one or more examples, the sidebar conversation may be terminated based on a spoken command (e.g., the second attendee speaking "end sidebar conversation", the first attendee speaking "goodbye", etc.). According to one or more examples, the sidebar conversation may be terminated by exceeding a pre-defined amount of time (e.g., the sidebar conversation terminated after 1 minute of silence between the first and second attendee). According to one or more examples, the sidebar conversation may be terminated by either the first attendee or the second attendee unmuting their microphone with respect to the main meeting.

Figure 2:
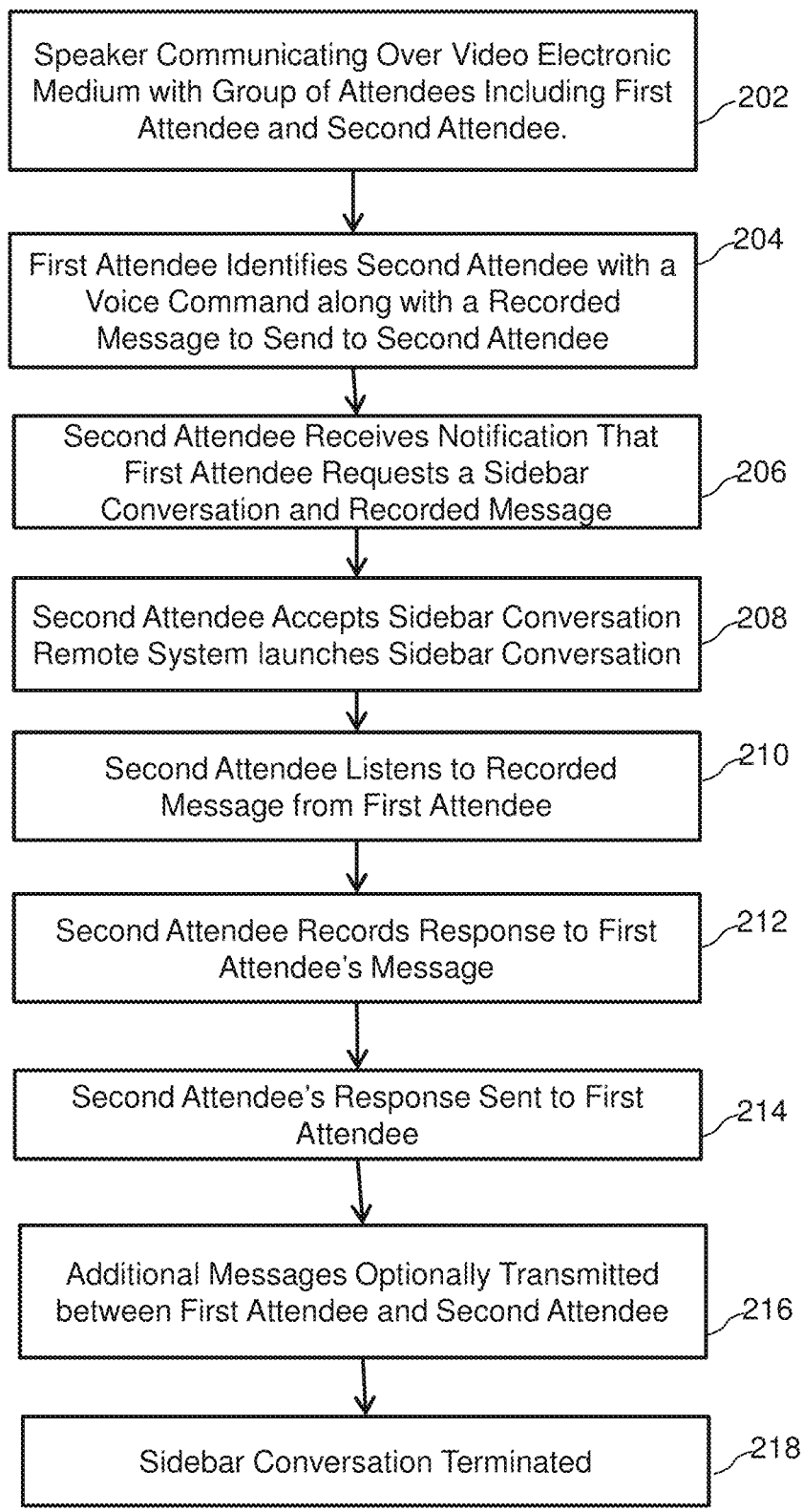
FIG. 2 is a flow diagram showing a method of performing a sidebar conversation in accordance with various examples.

Referring to FIG. 2, a sidebar conversation process is shown, according to one or more examples. At step 202, a speaker is communicating over an electronic medium (e.g., video conference or teleconference) with a group of attendees, which include a first attendee and a second attendee.

At step 204, the first attendee identifies the second attendee with a voice command along with recording a message for the second attendee. For example, assuming the first attendee is named Jonathan and the second attendee is named Benjamin, Jonathan speaks the phrase "Hey Benjamin, didn't that idea already come up last year and Nicole put together a document about it?" The terminal identifies the second attendee from the spoken information provided by the first attendee. After determining the second attendee based on the first attendees voice command, a sidebar conversation request is sent to the second attendee.

According to one or more examples, the terminal uses speech to text recognition to transcribe the voice command from the first attendee. The terminal then matches the transcription to a grammar that identifies a name in a slot after the word "Hey". The word corresponding to the slot in the grammar determines the name of the second attendee.

According to one or more examples, the terminal runs a phrase spotter that identifies "Hey" as a key word. It uses speech to text recognition to identify the name in the speech audio shortly after the key word.

According to one or more examples, the text to speech and techniques to identify the second attendee are performed on the server.

According to one or more examples, artificial intelligence (AI) is used to identify the second attendee. Attendee feedback such as a retry (indicating a failure) or not (indicating success) is used to train the AI that identifies the second attendee by reinforcement learning. The first and/or the second attendee is given an indication that a sidebar conversation has been initiated (e.g., visual display, sound, haptic response, etc.). The first attendee is given an indication of the second attendee, for which a sidebar conversation has been initiated (e.g., highlight the name of the second attendee on a list of names of attendees in the main meeting).

According to one or more examples, the first attendee may be given a visual indication that a sidebar request is pending (e.g., a spinning circle over the second attendee). The first attendee may receive an indication that the voice command was processed and/or a message is being recorded. According to one or more examples, the first attendee may include a priority in the sidebar conversation request. According to one or more examples, the recorded message may include the second attendee's name (e.g., "Hey Benjamin, didn't that idea already come up last year and Nicole put together a document about it?"). According to one or more examples, only speech or text following the phrase identifying the second attendee is sent to the second attendee. Therefore, the recorded message includes only the message (e.g., "didn't that idea already come up last year and Nicole put together a document about it?"). According to one or more examples, the voice message is converted to text by a speech-to-text function. According to one or more examples, after converting the voice command to text, the text may be added to meeting notes or a private chat log.

At step 206, the second attendee receives an indication that the first attendee requested a sidebar conversation and receives the recorded message, if one was provided. For example, the indication received by the second attendee may include a pop-up message, a visual queue, a sound, haptic response, etc. According to one or more examples, the recorded message from the first attendee is sent to the second attendee after the second attendee accepts the sidebar conversation request. The indication may include a visual cue to mute the second attendee's microphone with respect to the main meeting. According to one or more examples, the second attendee may receive a text version of the first attendee's message. For example, the second attendee may preview the text version of the first attendee's message before accepting the sidebar conversation request. The sidebar conversation request may timeout after the second attendee does not respond in a pre-defined amount of time.

At step 208, the second attendee accepts the sidebar conversation request from the first attendee. For example, the second attendee may click on a popup, issue a voice command, and/or provide any other type of acknowledgement to indicate the second attendee accepts the sidebar conversation request. According to one or more examples, when the second attendee accepts the sidebar conversation request, the server controls data (video and/or audio) received, which is captured by the first terminal's camera/microphone and the second terminal's camera/microphone, during the active sidebar conversation. During the sidebar conversation, the server prevents the audio, which is received from the first terminal or the second terminal, from being sent or transmitted to the main meeting, thereby effectively muting audio with respect to the main meeting. The server sends audio or transmits audio between the terminals that are participating in the sidebar conversation, thereby effectively unmuting audio with respect to the sidebar conversation.

According to one or more examples, the second attendee may pause the sidebar conversation, so that the sidebar conversation may be continued at a later time. For example, the sidebar conversation may be paused so that the first and second attendees can listen to the main presentation or session and then resume the sidebar conversation. According to one or more examples, the second attendee may reply with a pre-defined message (e.g., "let's talk at the break", "I'll respond back shortly", "Let's wait until the next speaker", etc.).

According to one or more examples, when either of two or all but one participant in a sidebar conversation pause, the sidebar conversation is represented in a graphical user interface as a tab or an item in a list that can be unpaused by clicking or double clicking or tapping, sliding, or making some other gesture. According to one or more example, whenever a participant in a sidebar conversation pauses, the sidebar conversation is represented by a tab or item in a list for that participant but not others. The sidebar conversation is thereby effectively muted for any participant who pauses a sidebar conversation from their terminal.

At step 210, the second attendee listens to the recorded message from the first attendee. The second attendee may listen to the recorded message in a fast replay mode. One potential benefit of the second attendee listening in a fast replay mode is that the second attendee is distracted from the main meeting for a shorter amount of time. According to one or more examples, the volume of the meeting for the second attendee may be reduced such that the second attendee can focus on the message but still have an opportunity to understand the speaker in the main meeting.

At step 212, the second attendee records a response to the first attendee's message. Recording a response may be the same or similar to the first attendee recording a message in step 204.

At step 214, the second attendee's response is sent to the first attendee. The first attendee may immediately listen to the response or may listen to the response at a later time. According to one or more examples, the response may be converted to text by a speech-to-text module. After converting the response to text, the text may be added to meeting notes or a private chat log.

At step 216, additional messages and responses are optionally transmitted between the first attendee and the second attendee. For example, the first attendee sends a second message based on the second attendee's response. According to one or more examples, messages may be delivered to and from the first and second attendee in real time (i.e., the only delay between when one attendee speaks and another attendee listens are due to the required processing and transmission of data delays). In other words, no artificial or intentional delays are put between the attendees. For example, the first attendee and the second attendee would have a one-to-one session in real-time like a private telephone call. For example, voice chat experience between the first and second attendee happens similar to any other session, such as the same or similar to the experience in the main session. According to one or more examples, after converting the speech (such as an initial message or response messages) to text, the text may be added to meeting notes or a private chat log.

The text may be made available to the meeting organizer or made available only to participants in the sidebar conversation. According to one or more examples, third or later attendees that join a sidebar conversation may only see text of sidebar conversation messages that were provided while they were in the sidebar conversation. This preserves the privacy of messages between sidebar conversation participants.

At step 218, the sidebar conversation is terminated. According to one or more examples, the sidebar conversation may be terminated based on a spoken command (e.g., an attendee participating in the side bar conversation speaking "end sidebar conversation," "goodbye," "talk to you later," "we are done," "sidebar done", etc.). The sidebar conversation may be terminated based on natural phrases to end a conversation (e.g., "goodbye", "talk to you later", "that was all I had", etc.). According to one or more examples, the terminal is programmed to recognize any desired phrase that indicates termination of the sidebar conversation. According to one or more examples, an attendee may customize their sidebar conversation sessions and specify words to end the conversation (e.g., "Benjamin out", "until next time", etc.), which may be defined by each attendee as part of programming or setting up the terminal for sidebar conversations.

According to one or more examples, the sidebar conversation may be terminated by exceeding an amount of time from the last message (e.g., the sidebar conversation is terminated after 1 minute of silence between the first and second attendee). According to one or more examples, a countdown timer may display the remaining time before the sidebar conversation is ended. Any of the sidebar conversation attendees may cancel the count down in order to maintain or continue the sidebar conversation. According to one or more examples, an attendee may specify the sidebar conversation termination by interacting with the terminal's meeting application module (e.g., clicking a terminate button; swiping or double clicking on the other attendee in a sidebar conversation's profile; unmuting the attendee's microphone with respect to the main meeting, etc.). According to one or more examples, before terminating a sidebar conversation, an attendee may be prompted to confirm ending the sidebar conversation.

According to one or more examples, an Artificial Intelligence (AI) model is used to analyze the status of the sidebar conversation and determine if and when to terminate a sidebar conversation. According to one or more examples, such a model is trained on logs of words spoken during sidebar conversations. Attendee's inputs or feedback, such as an immediate restart of the sidebar conversation or not, is used to train the AI model through reinforcement learning. For example, when an attendee is in a sidebar conversation and says "goodbye", an attendee may be prompted if they want to terminate the sidebar conversation. The attendee's response regarding ending the sidebar conversation can be used to train the AI model. After training the AI model, the AI model is updated and one possible result may be that termination may be performed without prompting the attendee.

According to one or more examples, information about the sidebar conversation may be retained after the sidebar conversation is terminated. For example, after a sidebar conversation is terminated between Benjamin and Jonathan, Jonathan may re-initiate a new sidebar conversation by saying "Continue Benjamin" or "Continue with Benjamin."

According to one or more examples, during a sidebar conversation, either the first attendee or the second attendee may be invited back into the main meeting by the speaker or another attendee participating in the main meeting. Thus, the terminal pauses or terminates the sidebar conversation to allow one or more of the attendees in the sidebar conversation to join the main meeting. For example, when either the first attendee and/or the second attendee is mentioned in the meeting, the terminal can recognize the spoken words as identifying the first attendee and/or the second attendee. The terminal compares the identified name with the list of names engaged in a sidebar conversation (as there may be multiple sidebar conversation between multiple difference attendees, which the terminal tracks). Once a name is matched to an attendee participating in the sidebar conversation, then the terminal invites that attendee (the one participating the sidebar conversation) back to the main meeting, and may pause and/or terminate the sidebar conversation the first and second attendee is participating in.

Upon rejoining the main meeting, the sidebar conversation participant may have lost the context of the meeting. According to one or more examples, upon rejoining the main meeting, a section of meeting audio, such as 10 seconds, is replayed for the rejoining meeting attendee to hear. To avoid delay in their catch-up, the replayed audio may occur at faster than real-time, such as at 2× real-time speed.

Adding Additional Attendee to Sidebar Conversation

Figure 3:
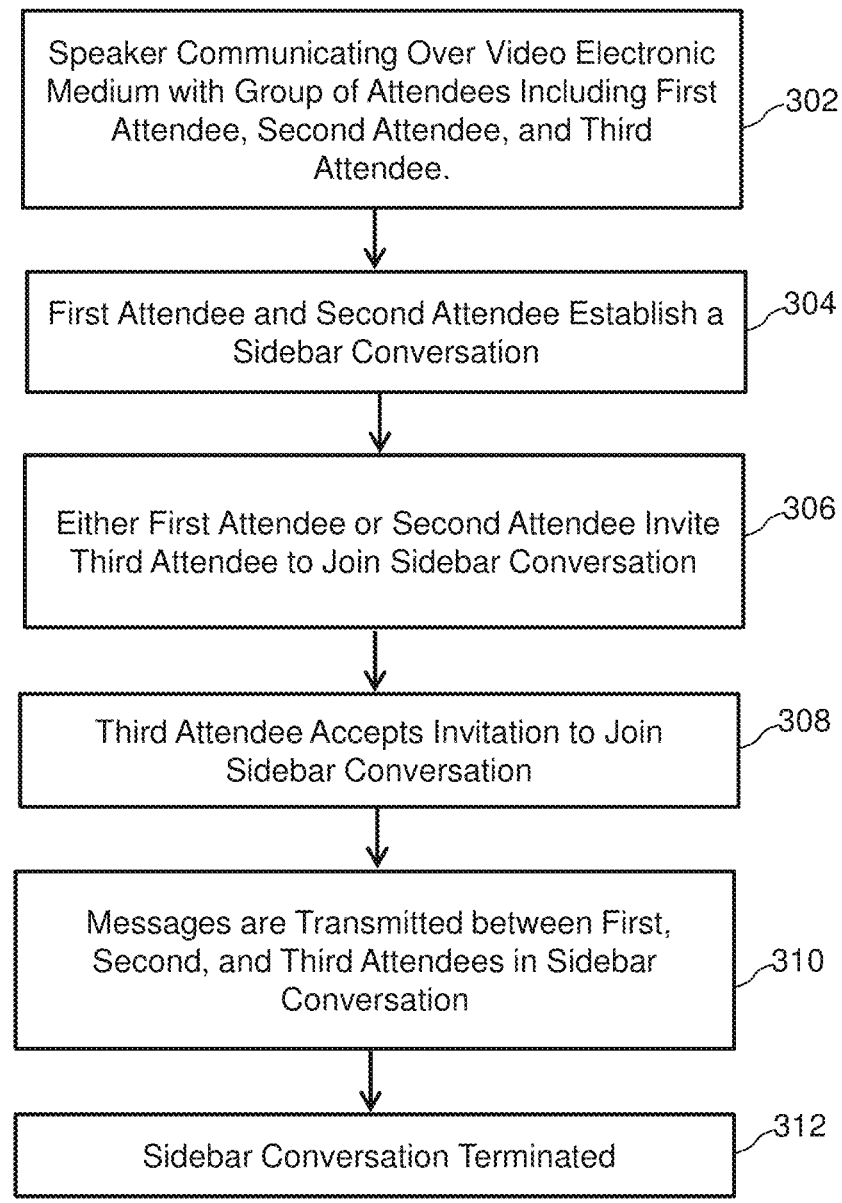
FIG. 3 is a flow diagram showing a method of adding a third attendee to a sidebar conversation in accordance with various examples.

Referring to FIG. 3, adding a third attendee to an existing sidebar conversation is shown, according to one or more examples. At step 302, a speaker is communicating over an electronic medium (e.g., teleconference) with a group of attendees that include a first attendee, a second attendee, and a third attendee. At step 304, the first attendee and the second attendee establish a sidebar conversation, as outline with respect to various examples discussed herein. At step 306, either the first attendee or the second attendee invites the third attendee to join the existing sidebar conversation. At step 308, the third attendee accepts the invitation to join the existing sidebar conversation. At step 310, messages are transmitted between the first, second, and third attendee.

According to one or more examples, all or part of the messages that were exchanged between the first and second attendee, may be shared with the third attendee after joining. The sharing of the past messages may be initiated by either the first attendee, the second attendee, or after approval by both the first and second attendee. At step 312, the sidebar conversation is terminated in ways such as ones described above.

According to one or more examples, an attendee (in a sidebar conversation with three or more attendees) may leave the sidebar conversation and the remaining attendees in the sidebar conversation may continue the sidebar conversation (e.g., the third attendee leaves the sidebar conversation, and the first and second attendee continue the sidebar conversation). According to one or more examples, the sidebar conversation may be terminated when any of the attendees leave the sidebar conversation (e.g., either the first or second or third attendee leaves the sidebar conversation and the sidebar conversation is terminated for the other attendees).

According to one or more examples, when an attendee has an existing or active sidebar conversation, a new sidebar conversation cannot be initiated until the existing sidebar conversation is terminated. According to one or more examples, when an attendee has an existing sidebar conversation and initiates a new sidebar conversation, the existing sidebar conversation is terminated. According to one or more examples, when an attendee has an existing sidebar conversation and initiates a new sidebar conversation, the existing sidebar conversation is paused and held active for that attendee while another sidebar conversation is initiated with other attendees.

Simultaneous Independent Sidebar Conversations

Figure 4:
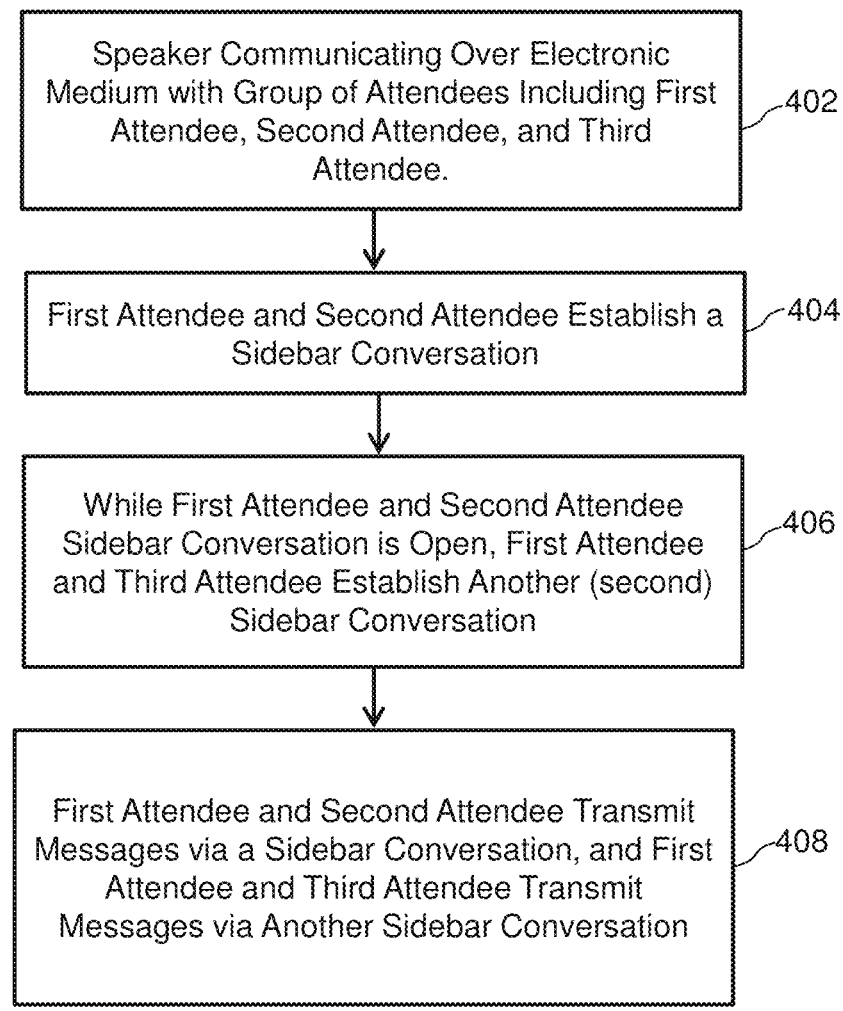
FIG. 4 is a flow diagram showing a method of performing simultaneous sidebar conversations in accordance with various examples.

Referring to FIG. 4, performing simultaneous sidebar conversations is shown, according to one or more examples. At step 402, a speaker is communicating over an electronic medium with a group of attendees that include a first attendee, a second attendee, and a third attendee. At step 404, the first attendee and the second attendee establish a first sidebar conversation. At step 406, while the first attendee and the second attendee's sidebar conversation remains open, another (second) sidebar conversation is established between the first attendee and the third attendee, in which the second attendee is not included. The first sidebar conversation and the second sidebar conversation operate independently of each other. According to one or more examples, two or more sidebar conversations may be joined into a single sidebar conversation. One of the attendees in the two sidebar conversation speaks or inputs a command to merge or combine the two sidebar conversations. According to one or more examples, only the attendee that is common to both sidebar conversations (in this example the first attendee) can initiate merging of the two sidebar conversations. According to one or more examples, existing sidebar conversations with more than two attendees may be split into multiple sidebar conversations. The split may be initiated by any one or more of the attendees in any of the existing sidebar conversations.

When an attendee is a participant in more than one sidebar conversation, each one may be represented visually as a separate tab or item in a list. The visual indication may show the names or avatars for all of the attendees participating in the sidebar conversation. The attendee may invoke one or another sidebar conversation by clicking, gesturing, or speaking an identifying phrase.

At step 408, the first attendee and the second attendee transmit messages via the sidebar conversation, and the first attendee and the third attendee transmit messages via the other (second) sidebar conversation. According to one or more examples, the first attendee identifies which sidebar conversation the message is intended for (e.g., "Jonathan . . . ", "Sidebar one", etc.). According to one or more examples, the first attendee (participating in two or more sidebar conversations) may name or label a sidebar conversation and use this name/label to address the specific sidebar conversation. For example, the first attendee may name the sidebar conversation with the second attendee "old product version." The first attendee may use the name "old product version" to indicate a message for the sidebar conversation with the second attendee. According to one or more examples, when not possible to tell which sidebar conversation an attendee intends the message for, the terminal prompts the attendee to specify the sidebar conversation, for which the message is intended. According to one or more examples, the terminal may include a trained AI model in order to infer or identify the sidebar conversation, for which the message is intended. For example, when the third attendee has not sent a message in an extended amount of time and the second attendee's message (is sent to) and has just been reviewed by the first attendee, the terminal can infer that the message from the first attendee is a response or intended for the second attendee.

Establishing a Sidebar Conversations

Figure 5:
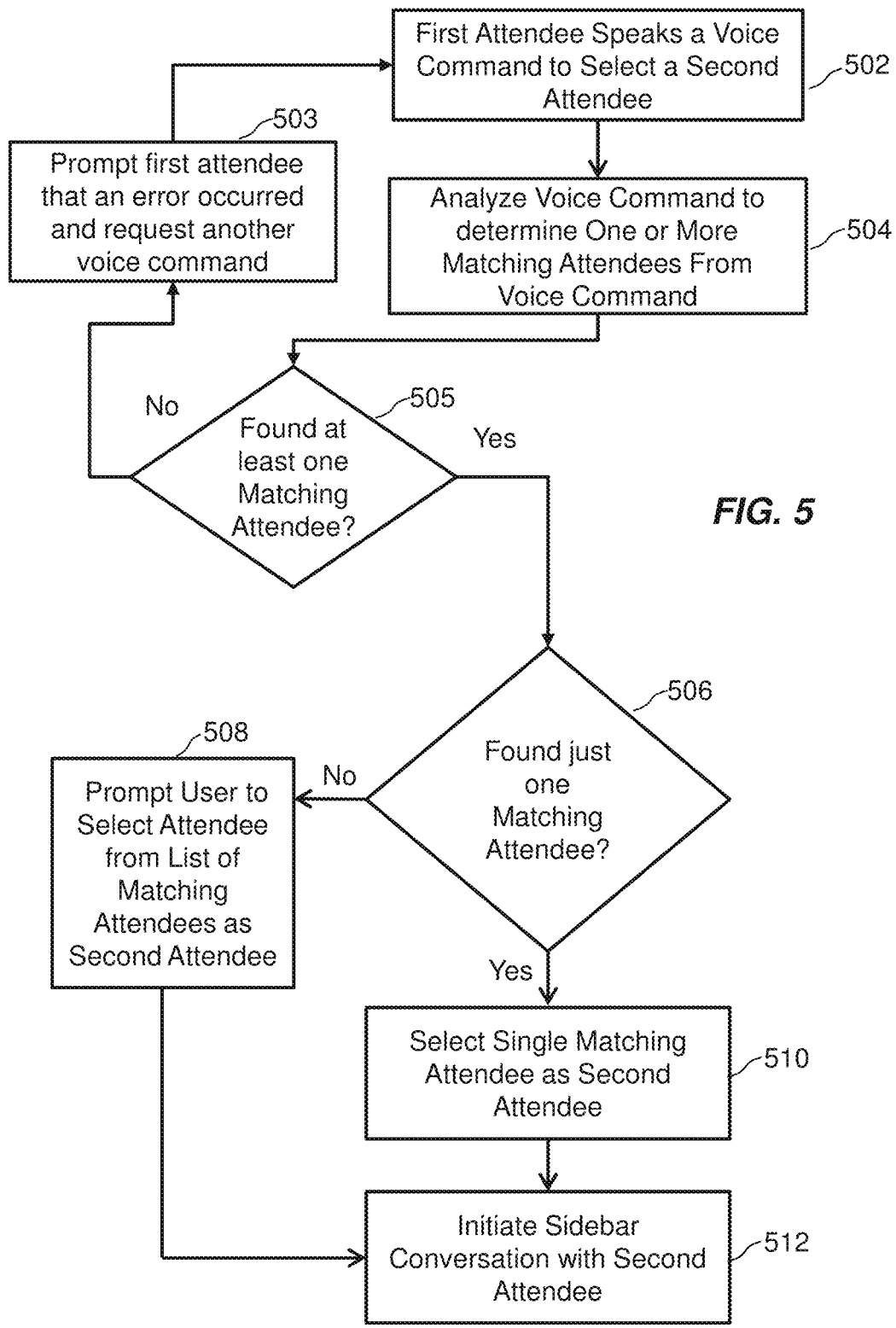
FIG. 5 is a flow diagram showing a method of identifying a second attendee to initiate a sidebar conversation in accordance with various examples.

Referring to FIG. 5, a process is shown that is executed by a user's terminal or server according to one or more examples, wherein a first attendee identifies a second attendee in order to initiate a sidebar conversation. At step 502, the first attendee speaks a voice command to select the second attendee (e.g., "Hey Benjamin"). According to one or more examples, the first attendee speaks a voice command followed by the message (e.g., "Hey Benjamin, didn't that idea already come up last year and Nicole put together a document about it?"). According to one or more examples, each attendee can personalize or customize the sidebar conversation during set-up or at any time after installation of the module controlling the sidebar conversations. The attendees may specify one or more names by which each attendee can be addressed by the terminal running the sidebar module (e.g., Benjamin can specify he can be addressed as "Ben" or "Benji", Jonathan can specify he can be addressed by his nickname of "Maverick", etc.). According to one or more examples, an attendee can specify one or more ways the attendee will be addressed by another attendee. For example, assuming an organization has two Jonathan's (one is sales and one in accounting) then Benjamin can specify when he says "sales Jon" he is referring to the Jonathan in the sales department. For another example, assuming an organization has two Jonathan's (one is sales and one in accounting) and Benjamin has a close working relationship with Jonathan in sales but has had no interaction with Jonathan in accounting then Benjamin can specify when he says "Jon" that he is referring to the Jonathan in the sales department. According to one or more examples, an attendee may be addressed by and/or assign a name (or label) to any other attendee (in the main meeting), and the name will be recognized by text to speech recognition as a new word.

According to one or more examples, a hand gesture may be used to indicate a sidebar conversation request is forthcoming. For example, when the first attendee has an open microphone to the main meeting and the first attendee at least partially covers their mouth, the first attendee's microphone to the main meeting is muted and a voice command by the first attendee is used to select the second attendee. The first attendee's camera is used to identify and determine the hand gesture and its meaning, respectively. According to one or more examples, an attendee's microphone has multiple modes of muting. For example: attendee's microphone may be muted to the meeting and enabled to listen for sidebar conversation commands; or the attendee's microphone may be muted to both the meeting and sidebar conversation commands (e.g., total mute); or the microphone may be active and capturing the voice commands and only routing or sending the voice commands a specific destination as determined by the terminal, which may be the main meeting control module or the sidebar conversation control module.

At step 504, the terminal analyzes the voice command from the first attendee attempting to initiate a sidebar conversation to determine if there are any matching attendees participating in the main meeting. At step 505, the terminal determines if there is at least one attendee identity information matching an attendee identified in the voice command. According to one or more examples, if no matching attendees are found at step 505, at step 503 an error message is communicated to the first attendee generating the voice command and the process return to step 502 to allow the first attendee to provide another voice command to clarify or update the information about the second attendee. According to one or more examples, a list of rules may be used to determine one or more matching attendees from the first attendee's voice command. According to one or more examples, determining one or more matching attendees may be based on the probability of how close of an attendee match is made. According to one or more examples, the AI model may be used to determine one or more matching attendees from the voice command. According to one or more examples, similar pronunciations may be used to determine matching attendees from the voice command. According to one or more examples, pronunciations due to accents and/or different regional pronunciations may be used to determine matching attendees from the voice command.

According to one or more examples, the one or more matching attendees could be inferred. For example, "Hi John" could be inferred to mean Jonathan. According to one or more examples, previous sidebar conversations may be used to determine one or more matching attendees. According to one or more examples, the voice command is broken down into a prefix plus a name. For example, the command "Hey Benjamin" is broken down as the prefix "Hey" and the name "Benjamin".

At step 506, after finding at least one matching attendee, the process determines if a single matching attendee is found. If a single matching attendee is found, then a confidence threshold of the single match accuracy is exceeded. According to one or more examples, at step 510 the first attendee is prompted to confirm the match before sending a sidebar conversation request (e.g., an attendee has a very poor pronunciation that only equates to a single person). According to one or more examples, the attendee may always be prompted to confirm the intended attendee before initiating a sidebar conversation.

If at step 506 more than a single match attendee is found, then step 508 is performed. At step 508, the first attendee is prompted to select the second attendee from the matching attendees. According to one or more examples, the first attendee may specify the second attendee by adding a last name or another identifier that would uniquely identify a second attendee (e.g., when there is multiple Benjamins in the meeting then the first attendee may specify "Benjamin Smith," "Benjamin from accounting," "the second Benjamin," etc.). According to one or more examples, the first attendee may select an attendee by clicking or tapping the name from a list.

At step 510, the single matching attendee is selected as the second attendee. At step 512, the terminal initiates a sidebar conversation between the first attendee and the second attendee.

Figure 6:
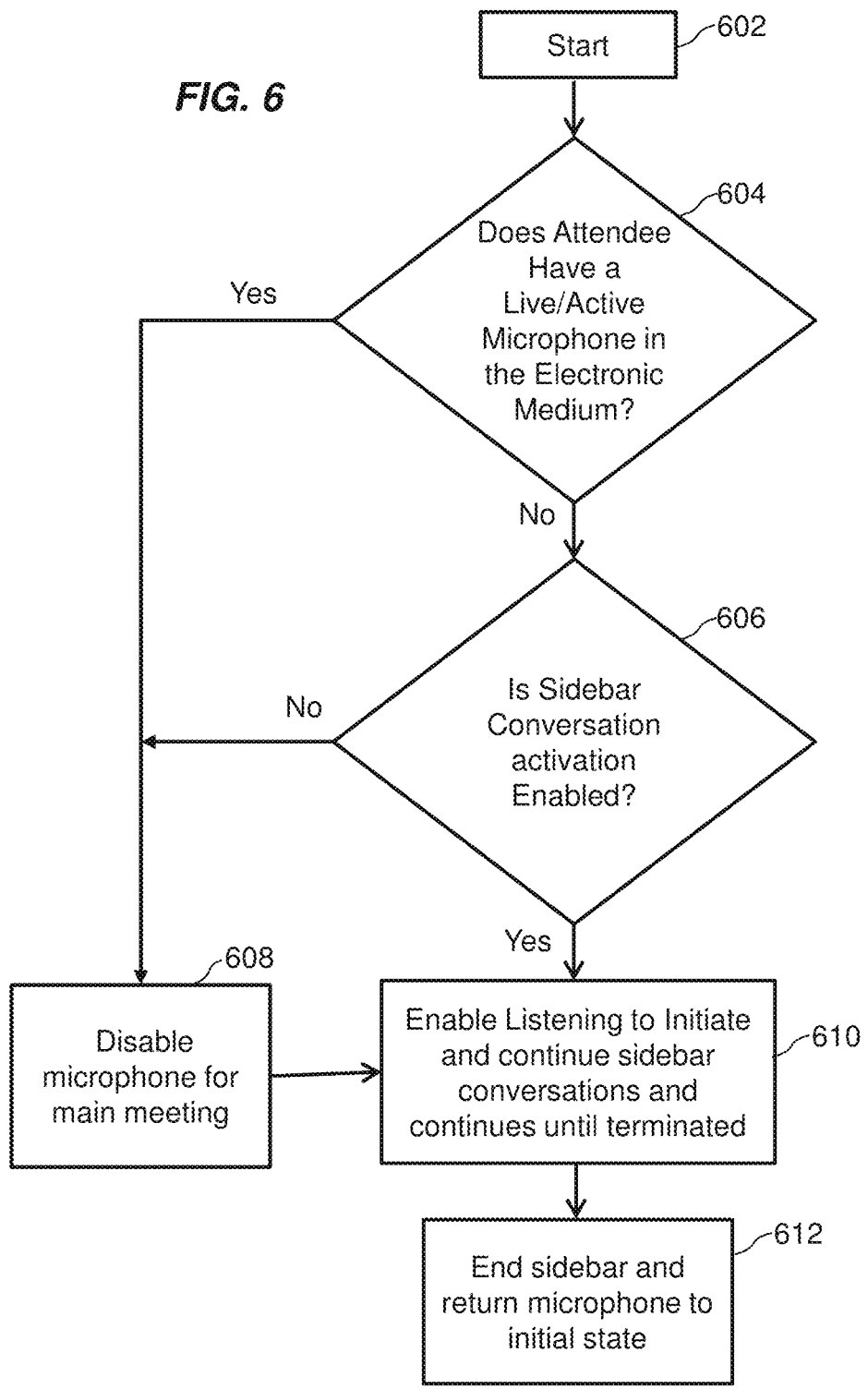
FIG. 6 is a flow diagram showing a method of determining to listen for sidebar conversation initiations in accordance with various examples.

Referring to FIG. 6, a process for the terminal listening for sidebar conversation initialization is shown according to one or more examples, starting at step 602. At step 604, a determination is made if a first attendee's microphone is live for the electronic medium (e.g., un-muted microphone to main meeting) and in relation to the main meeting. When the first attendee's microphone is live and the first attendee is attempting to initiate a sidebar conversation, then at step 608 the microphone is disabled with respect to the main meeting and remains live to capture voice commands from the first attendee. According to one or more examples, the first attendee's speaker volume may be adjusted as needed to allow for voice commands to be clearly captured without interference from the speaker output. At step 604, if the first attendee's microphone is not live with respect to the main meeting, then the process continues to step 606 to determine if the first attendee is participating in or trying to start a sidebar conversation. At step 606, a determination is made if sidebar conversations have been enabled. According to one or more examples, an attendee's sidebar conversation may be disabled and/or enabled for one or more of the attendees. For example, sidebar conversations to the speaker of the main meeting may be disabled or prevented while the speaker is presenting in the main meeting. For another example, while a chief executive officer (CEO) is presenting, all side bar conversations may be disabled, terminated, and/or paused. This improves employees' focus on messages that are important for a company. For another example, sidebar conversations may only be enabled for the organization's management. For another example, sidebar conversations may only be enabled within certain groups (e.g., executives, management, departments, teams, task force, etc.).

According to one or more examples, sidebar conversations may be disabled as a function of time or subject (e.g., only the department presenting can have sidebar conversations, sidebar conversation are enabled during meeting breaks, etc.). According to one or more examples, the sidebar conversations may be globally enabled and disabled. According to one or more examples, each attendee may specify if they are open to sidebar conversations. According to one or more examples, each attendee may specify which other attendees are allowed to request a sidebar conversation with them, as an attendee. When sidebar conversations are disabled, step 608 is performed. At step 608, the terminal may have a previous setting active, such that the feature of listening for voice commands to initiate sidebar conversations may still be disabled. When sidebar conversations are enabled, at step 610, the feature of listening for voice commands to initiate sidebar conversations is enabled or activated. The sidebar conversation continues until a command is received to terminate the sidebar conversation. At step 612, the process determines that the sidebar conversation is to be terminated or ended and ends the sidebar conversation.

Displaying Sidebar Conversations

Figure 7:
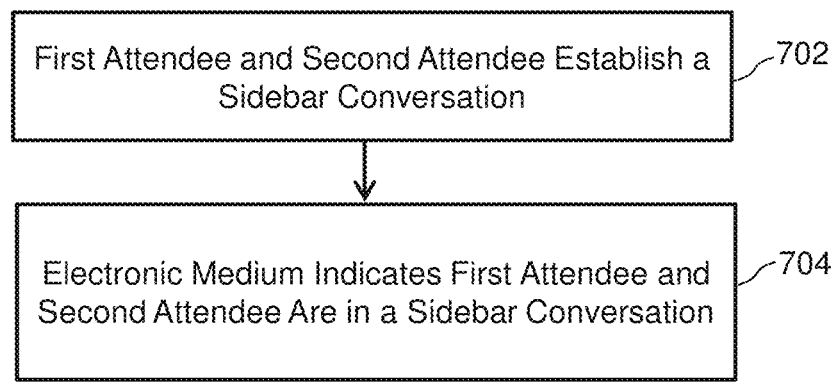
FIG. 7 is a flow diagram showing a method of displaying that a first and a second attendee are in a sidebar conversation to other attendees in accordance with various examples.

Referring to FIG. 7, a process is shown for displaying, to other attendees in the main meeting, that a first attendee and a second attendee are actively engaged in a sidebar conversation according to one or more examples. At step 702, the first attendee and the second attendee establish a sidebar conversation. At step 704, the terminal signals an electronic medium (e.g., teleconference), which indicates the first and second attendee are in a sidebar conversation. For example, during a video conference, the background and/or foreground of the first and/or second attendee may be at least partially blurred or color shifted (e.g., transformed from color to grayscale). For another example, during a video conference, if another attendee requests a sidebar conversation with the first and/or second attendee, then the profile of the first and/or second attendee is displayed to the other attendee; for example, at least partially blurred or color shifted (e.g., changed from transformed to grayscale). For another example, during a video conference, the live video stream of the first and second attendee may be replaced with a still photo or picture or words, any of which would indicate that participation in a sidebar conversation. For another example, an overlay may be put over the first and second attendee (e.g., an icon placed over first and second attendees). For another example, the first attendee and the second attendee may be removed from the list of attendees in the main meeting.

Buffer Mode

Figure 8:
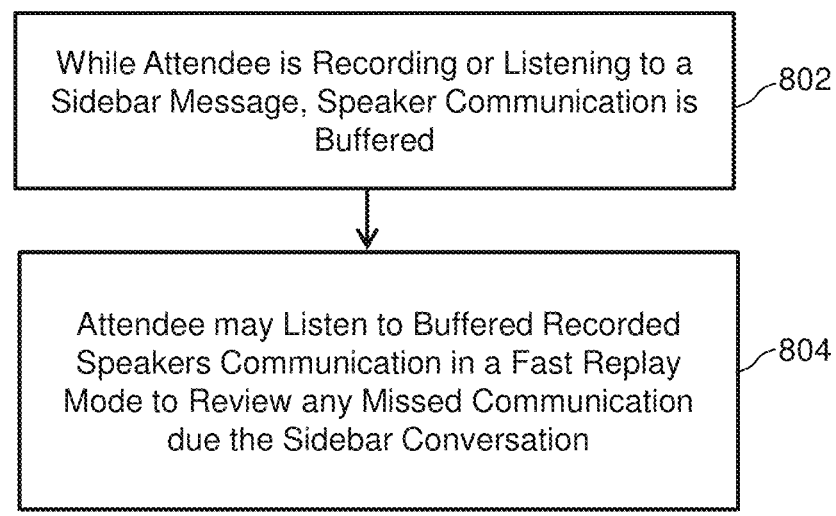
FIG. 8 is a flow diagram showing a method of buffering or recording of a main meeting during sidebar conversation in accordance with various examples.

Referring to FIG. 8, a process is shown for recording or buffering of a main meeting during an active sidebar conversation according to one or more examples. At step 802, when an attendee is participating in, recording, or listening to a sidebar conversation or message, the speaker's and other attendee's communication, which are part of the main meeting, are buffered. According to the various examples, the buffered information is stored locally at the terminal. According to the various examples, the buffered information is stored at a remote location and accessed through the terminal. During a video meeting the video and/or audio may be buffered. According to one or more examples, a part or the entire meeting, from the initiation command to start the sidebar conversation up to the present time or when the sidebar conversation is terminated, can be buffered.

At step 804, the attendee that was participating in the sidebar conversation can listen to or view the buffered main meeting. According to one or more examples, the attendee may listen and/or view the buffered meeting in fast replay mode. A potential benefit is to allow the attendee to watch the part of the meeting they missed during the sidebar conversation and reach the point where the attendee is watching the main meeting in real time. According to one or more examples, the attendee listens to the buffered main meeting at a later point in time.

Figure 9:
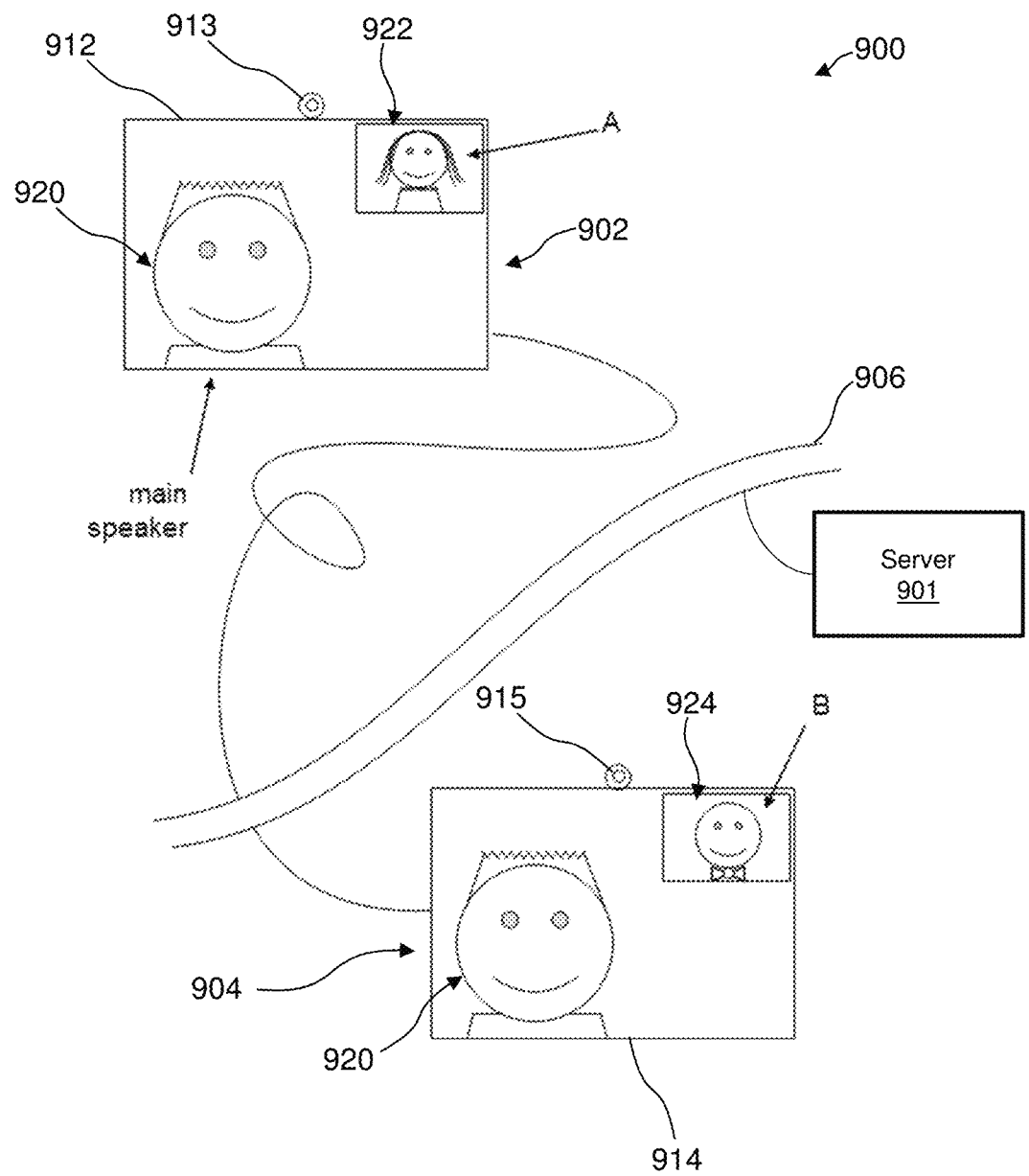
FIG. 9 is a schematic illustration showing a session and terminals communicating with a server for performing sidebar conversations in accordance with various examples.

Referring now to FIG. 9, a video conference session 900 is shown in accordance with various examples, wherein the session 900 is managed by and accessed through a server 901. The session 900 includes a speaker 920 communicating with a group of attendees, including a first attendee (B) and a second attendee (A). The first attendee is using a terminal 902 and is participating in the session 900. Likewise, the second attendee is using a terminal 904 and is participating in the session 900. The terminal 902 and the terminal 904 are connected to the internet 906 and have access to the server 901. The terminal 902 and the terminal 904 may be any type of terminal (a few non-limiting examples includes: a computer, a smart-phone, a flip-phone, or a smart-display/TV) that allows broadcasting of the session 900. According to one or more examples, the terminals 902 and 904 are hardwired (as shown) to an access point (e.g. a router) to allow connection to a Local Area Network (LAN) or the Internet 906. According to one or more examples, the terminals 902 and 904 are wirelessly (not shown) connected to the access point.

According to one or more examples, the terminal 902 includes a display 912 and camera 913. According to one or more examples, the terminal 902 uses alternative means for providing information, such as speaker or written format (e.g., text). after converting speech-to-text, to the attendee using the terminal 902. According to one or more examples, the terminal 904 includes a display 914 and a camera 915. According to one or more examples, the terminal 904 can use alternative means for providing information, such as speaker or written format (e.g., text), to the attendee using the terminal 904.

The first and second attendee are part of the session 900, wherein a speaker 920 is presenting to multiple attendees. The first attendee is using the terminal 902 to view the session 900 on the display 912. The second attendee is using the terminal 904 to view the session 900 on the display 914. As the first attendee initiates a sidebar conversation, the terminal 902 will capture commands (provided by the first attendee) and identifies the second attendee using any of the various examples outlined herein. Once the sidebar conversation is enabled, the display 912 of the terminal 902 opens a sidebar conversation window 922 and shows an image of attendee A of (or a name or other information for or associated with) the second attendee. Likewise, when the sidebar conversation is accepted by the second attendee, then the terminal 904 opens a sidebar conversation window 924 and shows an image of attendee B of (or a name or information for or associated with) the first attendee. In some examples, terminal 902 does not open a sidebar conversation window 922 until after attendee B accepts the sidebar conversation request.

The speaker 906 continues to present in the main session. Using the first attendee's terminal 902, which includes a sidebar conversation module, the first attendee initiates a sidebar conversation and can record a message for the second attendee. Using the second attendee's terminal 904, which module includes a sidebar conversation module, the second attendee accepts the sidebar conversation, records a response, and/or sends the response to the first attendee. Additional sidebar conversation messages may be optionally transmitted between the first and second attendee until the sidebar conversation is terminated. Terminals 902 and 904 may perform the same or similar function as steps 102 to 110 of FIG. 1. Terminals 902 and 904 may perform the same or similar function as steps 202 to 218 of FIGS. 2A and 2B. In some examples, the communication between terminals 902 and 904 pass through the server 901, but in some examples the server provides address information of terminals 902 and 904 to each other and the terminals communicate sidebar information directly.

Figure 10:
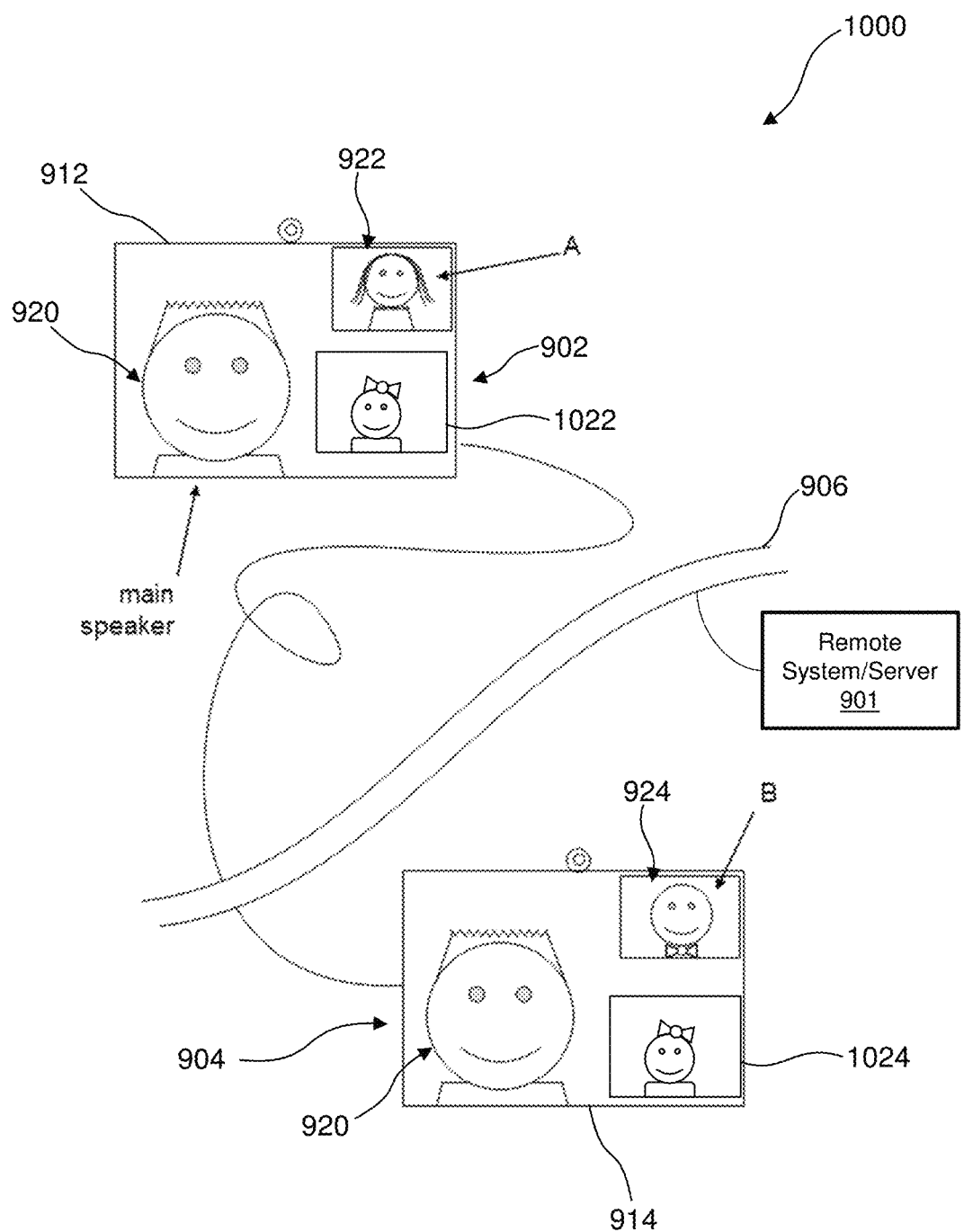
FIG. 10 is a schematic illustration showing a session and terminals communicating with a server for adding a third attendee to an existing sidebar conversation in accordance with various examples.

Referring now to FIG. 10, while the session 1000 is progress and the sidebar conversation between the first attendee and the second attendee is in progress, either the first attendee or the second attendee, as outlined herein, invites a third attendee from the main meeting to join the sidebar conversation. As noted herein, the third attendee's terminal (not shown) includes access to the internet and has sidebar conversation capability. The third attendee receives the request to join the sidebar conversation and accepts the sidebar conversation invitation. A sidebar conversation window 1022 is shown on the display 912 and a sidebar conversation window 1024 is shown on the display 914.

Likewise, a sidebar conversation window (not shown) is activated and displayed on the display of the third attendee's terminal. Information about the third attendee is displayed on the terminal 902 and the terminal 904, in the respective sidebar conversation window. One or more sidebar messages are transmitted between the first, second, and third attendees, which are all in the same sidebar conversation, until the sidebar conversation is terminated. Terminals 902 and 904 along with the third attendee's terminal may perform the same or similar function as steps 302 to 312 of FIG. 3.

Figure 11:
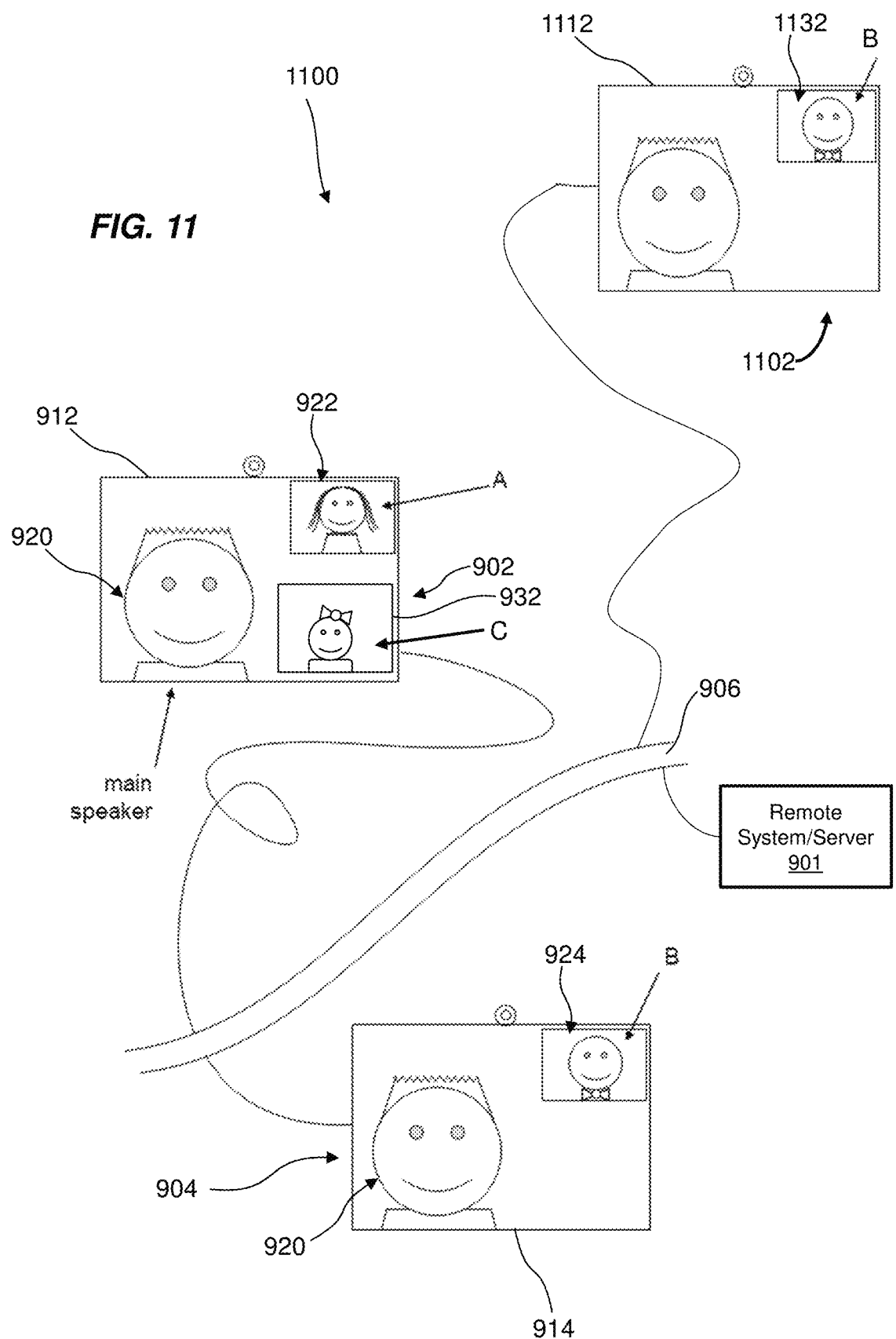
FIG. 11 is a schematic illustration showing a session and terminals communicating with a server for performing simultaneous sidebar conversations in accordance with various examples.

Referring now to FIG. 11, a session 1100 is shown with the first attendee (B) uses the terminal 902 to initiate two different sidebar conversations; one with the second attendee (A) and one with a third attendee (C). As noted herein, the session 1100 includes two independent sidebar conversations. For example, the first attendee and the second attendee establish a sidebar conversation as shown in the sidebar conversation windows 922 and 924. Then, the first attendee (using the terminal 902 that has a sidebar conversation module) and the third attendee (using a terminal 1102 that has a sidebar conversation module) establish another sidebar conversation that is shown in sidebar conversation window 932 and sidebar conversation window 1132. One or more sidebar messages are transmitted between the first and second attendee and between first and third attendee, which are independent sidebar conversations, until the respective sidebar conversation is terminated. The terminals 902, 904, and 1102 during the session 1100 may perform the same or similar function as steps 402 to 408 of FIG. 4.

Figure 12:
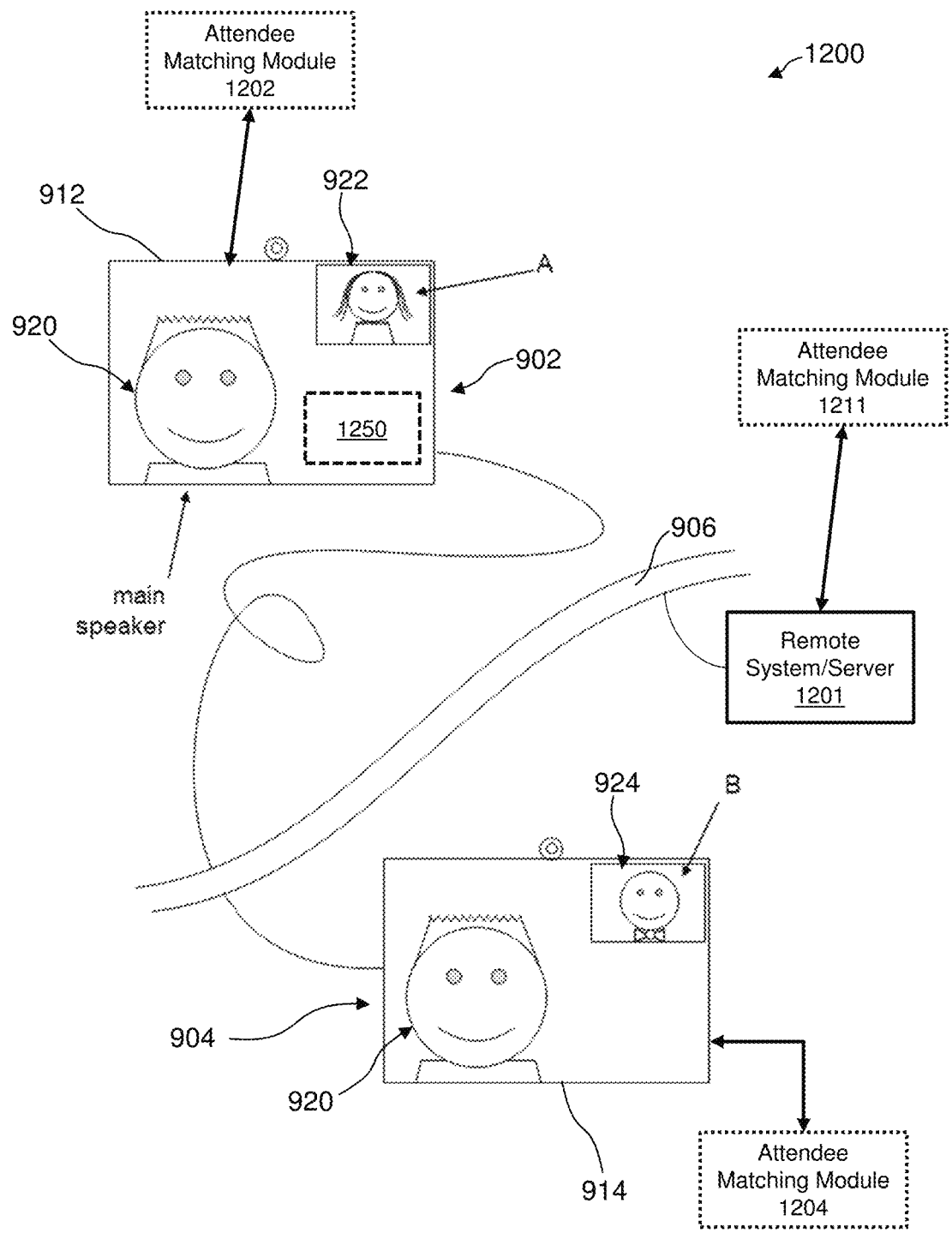
FIG. 12 is a schematic illustration showing a session and terminals communicating with a server for identifying, by input from a first attendee, a second attendee in order to initiate a sidebar conversation in accordance with various examples.

Referring now to FIG. 12, a session 1200 is shown that is controlled or managed by a server 1201. According to one or more examples, the server 1201 may include an attendee matching module 1211. The attendee matching module 1211 may be located at a remote location and accessed by the terminals 902 and 904 through the server 1201. For a non-limiting example, the terminal 902 sends and receives data and information from the server 1201, which uses the attendee matching module 1201 to identify the targeted attendee, with whom to start a sidebar conversation.

According to one or more examples, any terminal used by an attendee to initiate a sidebar conversation, such as terminal 902 and 904, may include an attendee matching module 1202 and attendee matching module 1204. The attendee matching module may be part of the terminal's hardware in accordance with the various examples. The attendee matching module may be loaded as an application or software module in the terminal in accordance with the various examples. The first attendee provides a command (in a format such as text input or verbal input) to identify a second (targeted) attendee in order to start or initiate a sidebar conversation. As a non-limiting example, the first attendee speaks a voice command into the terminal's microphone, which voice command is intended to select the second attendee. The terminal 902 captures the voice command (speech-to-text conversion is performed as needed) and transmits information from the voice command to the attendee matching module 1202. Attendee matching module 1202 determines one or more matching attendees for the voice command. When one matched attendee is found, the matched attendee is selected as the second attendee. When more than one matched attendee is found, the first attendee is prompted to select the second attendee from the list of matching attendees that is displayed in optional window 1250. The first attendee selects the second attendee and a sidebar conversation is initiated between the first attendee and the second attendee. In accordance with the various examples, the terminal 902 uses a trained AI model to assist in the selection of the correct (targeted) attendee. In accordance with the various examples, the AI model (module) may be part of the terminal 902 or later loaded as a module in the terminal 902 or remotely located at the server 1201. The terminal 902 and the terminal 904 during the session 1200 may perform some of or similar function as steps 502 to 512 of FIG. 5, steps 602 to 612 of FIG. 6, steps 702 to 704 of FIG. 7, and steps 802 to 804 of FIG. 8.

Server Implementations

Figure 13:
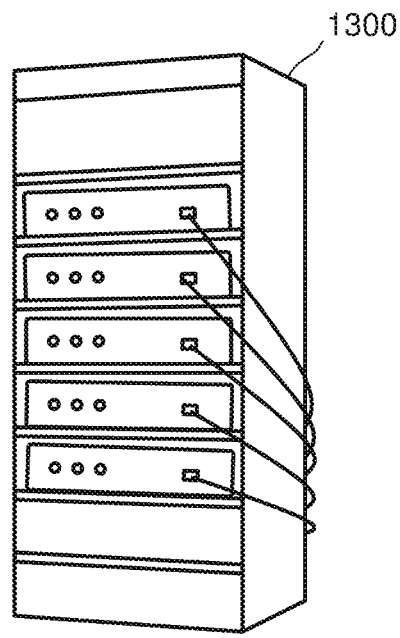
FIG. 13 is a schematic illustration of a server in accordance with the various examples.

Referring now to FIG. 13, a multi-processor server system 1300 is shown, which may be used to implement the terminals and/or perform the methods of the various aspects and embodiment of the invention. The server system 1300 includes a multiplicity of network-connected computer processors that executed code or run software in parallel.

Figure 14:
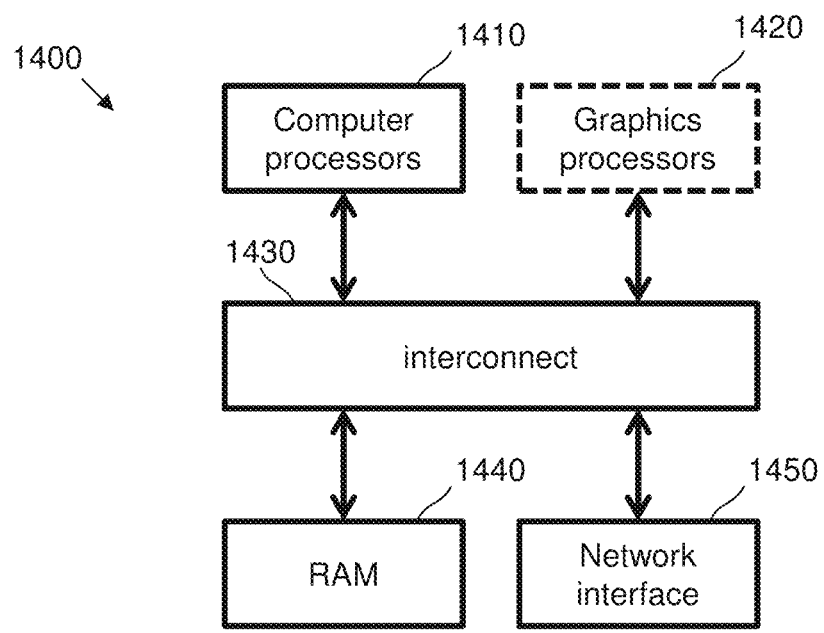
FIG. 14 is a schematic illustration showing components of any attendee terminals or the server used for sidebar conversations in accordance with the various examples.

Referring now to FIG. 14, a block diagram of a system 1400 that can be used to implement the various examples. The system 1400 includes computer processor (CPU) cores 1410, a multicore cluster of graphics processor (GPU) cores 1420. The processors connect through a board-level interconnect 1430 to random-access memory (RAM) devices 1440 for program code and data storage, such a buffering of main meeting during a sidebar conversation. The server system 1400 also includes a network interface 1450 to allow the processors to access a network such as a local area network (LAN) or the internet. By executing instructions stored in RAM devices 1440 through interface 1430, the CPUs 1410 and/or GPUs 1420 perform steps of methods as described herein. Embedded and mobile devices may have a similar arrangement of components but with other resources.

In certain examples, a non-transitory computer-readable storage medium may be provided that stores instructions to implement any of the described examples herein. The non-transitory computer readable medium may comprise one or more of a rotating magnetic disk, a rotating optical disk, a flash random access memory (RAM) chip, and other mechanically moving or solid-state storage media.

Various examples are methods that use the behavior of either or a combination of humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and examples encompass both structural and functional equivalents thereof.

The scope of the invention, therefore, is not intended to be limited to the examples shown and described herein. Rather, the scope and spirit of present invention is embodied by the appended claims.

What is claimed is:

1. A method comprising the steps of:
receiving a stream of audio from a first terminal while the first terminal is participating in a video conference;
detecting, within the stream of audio, a spoken trigger phrase indicating a request for a sidebar conversation;
recognizing, within the stream of audio, an identification of a second terminal that is also participating in the video conference;
sending a response message to the first terminal, the response message being conditioned upon status of the second terminal, wherein the response message includes information relating to the sidebar conversation availability between the first terminal and the second terminal; and
determining that the mode of the second terminal is unmuted when the information relating to the sidebar conversation availability between the first terminal and the second terminal indicates that the sidebar conversation will not be established.

2. The method of claim 1, wherein status of the second terminal includes confirmation that the second terminal can start the sidebar conversation.

3. The method of claim 1 further comprising the step of sending an initiation message to the second terminal to request initiation of the sidebar conversation.

4. The method of claim 1 further comprising the steps of:
sending a sidebar conversation request to the second terminal;
receiving an acceptance response from the second terminal; and
establishing the sidebar conversation between the first terminal and the second terminal.

5. The method of claim 4 further comprising the steps of:
controlling audio from the first terminal's microphone with respect to the video conference and the sidebar conversation, such that audio from the first terminal's microphone is sent only to one or more terminal participating in the sidebar conversation; and
controlling audio from the second terminal's microphone with respect to the video conference and the sidebar conversation, such that audio from the second terminal's microphone is sent only to one or more terminal participating in the sidebar conversation.

6. The method of claim 4 further comprising the steps of:
receiving, from one of the first terminal or the second terminal, a stream of sidebar audio that includes a second request to add a third terminal to the sidebar conversation;
recognizing, within the stream of sidebar audio, an identification of the third terminal that is participating in the video conference; and
sending a second response message to the terminal that sent the stream of sidebar audio,
wherein the second response message is conditioned upon status of the third terminal.

7. The method of claim 4 further comprising the steps of:
recording the video conference while the sidebar conversation is active; and
accessing, by a terminal participating in the sidebar conversation, the recorded video conference.

8. The method of claim 4 further comprising the steps of:
receiving, from one of the first terminal or the second terminal, a stream of second audio;
detecting a second trigger phrase with the stream of second audio, the second trigger phrase indicating a request for a simultaneous second sidebar conversation while the sidebar conversation is active;
recognizing, within the stream of second audio, an identification of a third terminal that is participating in the video conference; and
sending a second response message to the terminal that sent the stream of second audio,
wherein the second response is conditioned upon status of the third terminal.

9. The method of claim 1 further comprising the steps of:
sending a sidebar conversation request to the second terminal; and
receiving a rejection response from the second terminal,
wherein the response message to the first terminal indicates that the sidebar conversation will not be established.

10. The method of claim 1 wherein the identification is ambiguous because the identification matches a plurality of terminals, the method further comprising the step of sending a clarification message to the first terminal, wherein the clarification message includes an attendee's information for each of the plurality of terminals, to select one terminal from the plurality of matching terminals.

11. A non-transitory computer-readable storage medium storing instructions which, when executed by at least one processor, cause at least one processor to:
detect, within a stream of audio received from a first terminal participating in a main meeting, a spoken trigger phrase indicating a request for a sidebar conversation;
recognize, within the stream of audio, an identification of a second terminal that is also participating in the main meeting;
send a response message to the first terminal, wherein the response message is conditioned upon status of the second terminal and includes information about availability of starting the sidebar conversation between the first terminal and the second terminal; and
determine that the mode of the second terminal is unmuted when the information relating to the sidebar conversation availability between the first terminal and the second terminal indicates that the sidebar conversation will not be established.

12. The non-transitory computer-readable storage medium of claim 11 storing instructions that further cause the at least one processor to confirm that the second terminal can start the sidebar conversation.

13. The non-transitory computer-readable storage medium of claim 11 storing instructions that further cause the at least one processor to send an initiation message to the second terminal to request initiation of the sidebar conversation.

14. The non-transitory computer-readable storage medium of claim 11 storing instructions that further cause the at least one processor to:
send a sidebar conversation request to the second terminal;
receive an acceptance response from the second terminal; and
establish a sidebar conversation between the first terminal and the second terminal.

15. The non-transitory computer-readable storage medium of claim 14 storing instructions that further cause the at least one processor to:
control audio from the first terminal's microphone with respect to the video conference and the sidebar conversation, such that audio from the first terminal's microphone is sent only to one or more terminal participating in the sidebar conversation; and control audio from the second terminal's microphone with respect to the video conference and the sidebar conversation, such that audio from the second terminal's microphone is sent only to one or more terminal participating in the sidebar conversation.

16. The non-transitory computer-readable storage medium of claim 14 storing instructions that further cause the at least one processor to:

receive, from one of the first terminal or the second terminal, a stream of sidebar audio that includes a second request to add a third terminal to the sidebar conversation;

recognize, within the stream of sidebar audio, an identification of the third terminal that is participating in the video conference; and send a second response message to the terminal that sent the stream of sidebar audio, wherein the second response message is conditioned upon status of the third terminal.

17. The non-transitory computer-readable storage medium of claim 14 storing instructions that further cause the at least one processor to:

record the video conference while the sidebar conversation is active; and access, by a terminal participating in the sidebar conversation, the recorded video conference.

18. The non-transitory computer-readable storage medium of claim 14 storing instructions that further cause the at least one processor to:

receive, from one of the first terminal or the second terminal, a stream of second audio;

detect a second trigger phrase with the stream of second audio, the second trigger phrase indicating a request for a simultaneous second sidebar conversation while the sidebar conversation is active;

recognize, within the stream of second audio, an identification of a third terminal that is participating in the video conference; and send a second response message to the terminal that sent the stream of second audio, wherein the second response is conditioned upon status of the third terminal.

19. The non-transitory computer-readable storage medium of claim 11 storing instructions that further cause the at least one processor to:

send a sidebar conversation request to the second terminal; and receive a rejection response from the second terminal, wherein the response message to the first terminal indicates that the sidebar conversation will not be established.

20. The non-transitory computer-readable storage medium of claim 11, wherein the identification is ambiguous because the identification matches a plurality of terminals, the non-transitory computer-readable storage medium storing instructions that further cause the at least one processor to send a clarification message to the first terminal, wherein the clarification message includes an attendee's information for each of the plurality of terminals, to select one terminal from the plurality of matching terminals.

21. A method comprising the steps of:

receiving a request to establish a sidebar conversation, the request being from a first terminal that is participating in a main meeting;

recognizing, within the request, an identity of a second terminal that is also participating in the main meeting;

determining, using a processor, that the second terminal is available to participate in the sidebar conversation;

determining that the second terminal is in a muted mode;

sending a request to the second terminal in response to the second terminal being available to participate in the sidebar conversation; and establishing the sidebar conversation in response to the second terminal accepting the request.

22. The method of claim 21 further comprising the steps of:

preventing the first terminal's microphone from sending audio to the main meeting while sending audio to the second terminal when the sidebar conversation is active; and preventing the second terminal's microphone from sending audio to the main meeting while sending audio to the first terminal when the sidebar conversation is active.

23. The method of claim 21, wherein the main meeting is a video conference.

24. The method of claim 21, wherein the main meeting is a teleconference.

25. A method comprising the steps of:

receiving a request to establish a sidebar conversation, the request being from a first terminal that is participating in a main meeting, wherein the request includes an ambiguous identity;

recognizing, within the request, an identity of a second terminal that is also participating in the main meeting;

determining, using a processor, that the second terminal is available to participate in the sidebar conversation;

sending a request to the second terminal in response to the second terminal being available to participate in the sidebar conversation;

establishing the sidebar conversation in response to the second terminal accepting the request;

sending a clarification message to the first terminal; and receiving a clarification response from the first terminal, the clarification response including the identity of the second terminal.

26. A method comprising the steps of:

receiving a stream of audio from a first terminal while the first terminal is participating in a video conference;

detecting, within the stream of audio, a spoken trigger phrase indicating a request for a sidebar conversation;

recognizing, within the stream of audio, an identification of a second terminal that is also participating in the video conference;

sending a response message to the first terminal, the response message being conditioned upon status of the second terminal, wherein the response message includes information relating to the sidebar conversation availability between the first terminal and the second terminal;

sending a sidebar conversation request to the second terminal;

receiving an acceptance response from the second terminal;

establishing a sidebar conversation between the first terminal and the second terminal;

recording the video conference while the sidebar conversation is active; and accessing, by a terminal participating in the sidebar conversation, the recorded video conference.

27. The method of claim 26, wherein status of the second terminal includes confirmation that the second terminal can start the sidebar conversation.

28. The method of claim 26 further comprising the step of sending an initiation message to the second terminal to request initiation of the sidebar conversation.

29. The method of claim 26 further comprising the step of determining that the mode of the second terminal is unmuted when the information relating to the sidebar conversation availability between the first terminal and the second terminal indicates that the sidebar conversation will not be established.

30. The method of claim 26 further comprising the steps of:
controlling audio from the first terminal's microphone with respect to the video conference and the sidebar conversation, such that audio from the first terminal's microphone is sent only to one or more terminal participating in the sidebar conversation; and
controlling audio from the second terminal's microphone with respect to the video conference and the sidebar conversation, such that audio from the second terminal's microphone is sent only to one or more terminal participating in the sidebar conversation.

31. The method of claim 26 further comprising the steps of:
receiving, from one of the first terminal or the second terminal, a stream of sidebar audio that includes a second request to add a third terminal to the sidebar conversation;
recognizing, within the stream of sidebar audio, an identification of the third terminal that is participating in the video conference; and
sending a second response message to the terminal that sent the stream of sidebar audio, wherein the second response message is conditioned upon status of the third terminal.

32. The method of claim 26 further comprising the steps of:
receiving, from one of the first terminal or the second terminal, a stream of second audio;
detecting a second trigger phrase with the stream of second audio, the second trigger phrase indicating a request for a simultaneous second sidebar conversation while the sidebar conversation is active;
recognizing, within the stream of second audio, an identification of a third terminal that is participating in the video conference; and
sending a second response message to the terminal that sent the stream of second audio, wherein the second response is conditioned upon status of the third terminal.

33. The method of claim 26 further comprising the steps of:
sending a sidebar conversation request to the second terminal; and
receiving a rejection response from the second terminal, wherein the response message to the first terminal indicates that the sidebar conversation will not be established.

34. The method of claim 26 wherein the identification is ambiguous because the identification matches a plurality of terminals, the method further comprising the step of sending a clarification message to the first terminal, wherein the clarification message includes an attendee's information for each of the plurality of terminals, to select one terminal from the plurality of matching terminals.

35. A non-transitory computer-readable storage medium storing instructions which, when executed by at least one processor, cause at least one processor to:
detect, within a stream of audio received from a first terminal participating in a main meeting, a spoken trigger phrase indicating a request for a sidebar conversation;
recognize, within the stream of audio, an identification of a second terminal that is also participating in the main meeting;
send a response message to the first terminal, wherein the response message is conditioned upon status of the second terminal and includes information about availability of starting the sidebar conversation between the first terminal and the second terminal;
send a sidebar conversation request to the second terminal;
receive an acceptance response from the second terminal;
establish a sidebar conversation between the first terminal and the second terminal;
record the video conference while the sidebar conversation is active; and
access, by a terminal participating in the sidebar conversation, the recorded video conference.

36. The non-transitory computer-readable storage medium of claim 35, wherein status of the second terminal includes confirmation that the second terminal can start the sidebar conversation.

37. The non-transitory computer-readable storage medium of claim 35 storing instructions that further cause the at least one processor to send an initiation message to the second terminal to request initiation of the sidebar conversation.

38. The non-transitory computer-readable storage medium of claim 35 storing instructions that further cause the at least one processor to determine that the mode of the second terminal is unmuted when the information relating to the sidebar conversation availability between the first terminal and the second terminal indicates that the sidebar conversation will not be established.

39. The non-transitory computer-readable storage medium of claim 35 storing instructions that further cause the at least one processor to:
control audio from the first terminal's microphone with respect to the video conference and the sidebar conversation, such that audio from the first terminal's microphone is sent only to one or more terminal participating in the sidebar conversation; and
control audio from the second terminal's microphone with respect to the video conference and the sidebar conversation, such that audio from the second terminal's microphone is sent only to one or more terminal participating in the sidebar conversation.

40. The non-transitory computer-readable storage medium of claim 35 storing instructions that further cause the at least one processor to:
receive, from one of the first terminal or the second terminal, a stream of sidebar audio that includes a second request to add a third terminal to the sidebar conversation;
recognize, within the stream of sidebar audio, an identification of the third terminal that is participating in the video conference; and
send a second response message to the terminal that sent the stream of sidebar audio, wherein the second response message is conditioned upon status of the third terminal.

41. The non-transitory computer-readable storage medium of claim 35 storing instructions that further cause the at least one processor to:
- receive, from one of the first terminal or the second terminal, a stream of second audio;
- detect a second trigger phrase with the stream of second audio, the second trigger phrase indicating a request for a simultaneous second sidebar conversation while the sidebar conversation is active;
- recognize, within the stream of second audio, an identification of a third terminal that is participating in the video conference; and
- send a second response message to the terminal that sent the stream of second audio, wherein the second response is conditioned upon status of the third terminal.

42. The non-transitory computer-readable storage medium of claim 35 storing instructions that further cause the at least one processor to:
- send a sidebar conversation request to the second terminal; and
- receive a rejection response from the second terminal, wherein the response message to the first terminal indicates that the sidebar conversation will not be established.

43. The non-transitory computer-readable storage medium of claim 35 wherein the identification is ambiguous because the identification matches a plurality of terminals, the non-transitory computer readable storage medium storing instructions that further cause the at least one processor to send a clarification message to the first terminal, wherein the clarification message includes an attendee's information for each of the plurality of terminals, to select one terminal from the plurality of matching terminals.

* * * * *